Oct. 25, 1938.  F. PESARESE  2,134,621

BEARING

Filed June 14, 1935  7 Sheets-Sheet 1

Inventor:
Fritz Pesarese

Oct. 25, 1938.  F. PESARESE  2,134,621
BEARING
Filed June 14, 1935  7 Sheets-Sheet 2

Inventor:

Oct. 25, 1938.  F. PESARESE  2,134,621
BEARING
Filed June 14, 1935   7 Sheets-Sheet 3

Inventor:

Oct. 25, 1938.   F. PESARESE   2,134,621
BEARING
Filed June 14, 1935   7 Sheets-Sheet 5

Inventor:
Fritz Pesarese

Oct. 25, 1938.    F. PESARESE    2,134,621
BEARING
Filed June 14, 1935    7 Sheets-Sheet 6

Inventor:

Oct. 25, 1938.  F. PESARESE  2,134,621
BEARING
Filed June 14, 1935  7 Sheets-Sheet 7

Inventor:

Patented Oct. 25, 1938

2,134,621

UNITED STATES PATENT OFFICE 2,134,621

BEARING

Fritz Pesarese, Grundschottel, Germany, assignor to the firm: Eisen- u. Stahlwerk Walter Peyinghaus, Egge, Germany Application June 14, 1935, Serial No. 26,650
In Germany June 23, 1934

1 Claim. (Cl. 308—121)

The present invention relates to improvements in or relating to bearings.

It is an object of the present invention to provide a bearing of improved construction whereby efficient lubrication can be obtained.

It is a further object of the invention to provide an improved bearing in which provision is made for circulating and cooling the lubricant.

It is a further object of the invention to provide an improved bearing in which a closer approximation to the ideal condition of centering by means of the lubricant itself can be obtained than in previously known bearings.

In the following, for the sake of convenience reference will be made to the bearing and the shaft but it will be understood that the invention is applicable to bearings for any rotatable parts so that the word shaft as used herein is intended to cover any part mounted in a bearing for relative rotation with respect to the bearing. Further the invention is equally applicable whether the shaft rotates or the bearing rotates on the shaft or where both rotate at different speeds or in opposite directions.

Moreover for purposes of convenience it will be assumed in the following that the bearing blocks or surfaces are applied to the bearing or outer member but the invention is equally applicable to cases where the said blocks or surfaces are applied to the inner member or shaft although such cases will be unlikely to occur as a rule in practice. In other words the invention is applicable to internal bearings as well as to external bearings.

It is known that bearings hitherto known have not been entirely satisfactory in practice and have not operated at the highest efficiency because the strength and therefore the thickness of the oil or other lubricant layer can only be produced above the minimum thickness necessary for fluid friction to occur within a narrow range of speeds.

All attempts to alter these conditions have been without any real success, and only relatively small improvements have been attained by such measures as assisting the dissipation of the heat of friction, improving the quality of the materials and lubricants used and improving the accuracy of the bearing surfaces.

According to the present invention I provide a bearing having a plurality of bearing surfaces at least one of which forms between itself and the shaft a narrow space tapering in the direction of rotation to a minimum, the surfaces bounding said space being free from interruption or discontinuity in a circumferential direction and provision being made for introducing lubricant into said space at the wider end whereby when the shaft is rotating under the conditions of intended use a fluid pressure is built up in said space increasing in the direction of rotation to a maximum pressure at the narrow end of said space to provide an effective layer of lubricant between the shaft and the bearing surface.

According to a further feature of the invention I provide a bearing including a bearing surface extending on either side of a zone or line of principal load on the bearing, the said bearing surface being uninterrupted and being so shaped and arranged as to provide a space at one end at least between the shaft and the surface, the said space or spaces continuously narrowing over a substantial arcuate length from the end or ends towards the central portion, provision being made whereby lubricant can be supplied to the shaft at or near the end or ends of said surface.

According to the present invention also I provide a bearing in which the lubricant is introduced solely outside the intended zone or zones of principal load, the lubricant being introduced at the wider end of narrow arcuate spaces formed between the shaft and the surface or surfaces of the bearing which spaces taper in the direction of rotation of the shaft to a minimum at or near a point of principal load the bounding walls of said spaces being without interruption in a circumferential direction and being so dimensioned that upon rotation of the shaft under all normal conditions of use with a suitable supply of lubricant said spaces are substantially filled with oil whereby the shaft is supported in all directions by lubricant pressure within said spaces.

The invention is particularly applicable to bearings comprising two or more separate blocks or brasses but if desired closed annular bearings may be constructed according to the present invention. In the latter case the surface of the bearings must be so shaped that it continuously approaches and recedes from the shaft to provide as in the other cases narrow more or less wedgelike arcuate spaces and provision is made for introducing lubricant to the shaft at the places where the surface is furthest removed from the shaft.

The bearing surfaces must in any case be free from interruptions between the places at which lubricant is introduced and the next point at which the space between the shaft and the bearing is a minimum considered in the direction of rotation of the shaft.

If the bearing is for a shaft which is to rotate in both directions i. e. a reversible shaft, the said arcuate wedgelike spaces must be provided on both sides of each point or region of minimum distance between shaft and bearing surface.

It is preferred to space the several bearing surfaces uniformly round the shaft and to introduce the lubricant at uniformly spaced positions. Thus in such a case where the lubricant is introduced at an even number of places the said places will be arranged in pairs of diametrically opposed places. In the case of an odd number of lubricant supply places or points each of the latter will be diametrically opposed to a bearing surface. This uniform distribution of the surfaces favours proper centering of the shaft by means of the lubricant.

A bearing constructed in accordance with the present invention preferably comprises two or more bearing blocks or brasses symmetrically disposed or uniformly spaced with respect to the shaft. The bearing surface of each block may be of cylindrical curvature and may then have a somewhat greater radius than the sum of the radius of the shaft and the minimum thickness of the oil film to be produced between the shaft and the bearing. The radius of a circle drawn to touch each bearing surface will then be somewhat less than the radius of curvature of each bearing surface and will be equal to the sum of the radius of the shaft and half the desired clearance. If desired the bearing surfaces of the blocks may be cylindrical over most of their area but terminating in plane portions which are tangential to the cylindrical central portions. If desired however the curvature of the bearing blocks may be of other curvature than circular such for example as parabolic or elliptical with or without tangential end portions provided that suitable narrow wedgelike arcuate spaces are provided between the bearing surfaces and the shaft. Again if desired the bearing surfaces may be of cylindrical curvature over most of their area, and the radius of this curvature may be equal to the radius of the shaft plus half the desired clearance. Near the ends of the blocks however the curvature must be decreased and may become zero in order to provide for the aforesaid arcuate spaces of tapering form between shaft and bearing.

In any case the surfaces are preferably rounded off at the ends to avoid sharp terminating edges. The spaces between successive bearing blocks may then provide channels for the introduction of lubricant to the shaft.

The lubricant to be supplied to the shaft at or near the initial parts of the said narrow wedgelike arcuate spaces between bearing and shaft may be fresh lubricant or used lubricant and any suitable means may be provided for supplying the lubricant at said places if desired under pressure and/or for circulating the lubricant so as to reintroduce it continuously to the bearing after use. Special provision may be made for cooling the lubricant to be supplied to the bearing (either fresh lubricant or circulated used lubricant) but in general the circulation of the lubricant outside the bearing will provide sufficient cooling.

It is preferred to supply the lubricant to the spaces between successive blocks by causing it to flow over the external surfaces of the blocks and thence to the lubricant supply spaces.

Owing to the introduction of the lubricant at the initial parts (considered in the direction of rotation of the shaft) of the narrow wedgelike arcuate spaces, the lubricant introduced is apparently carried round by the shaft into a continuously narrowing space with the result that the pressure of the lubricant increases progressively and probably reaches a maximum where the distance between the shaft and the bearing surface is a minimum. After this where the distance starts to increase again the pressure is reduced. The pressure produced in the lubricant when the shaft is rotating is sufficient over a very wide range of speeds to lift the bearing surface off the shaft or vice versa even under heavy loads. Naturally the obtaining of the best possible results in any particular case will be obtained by suitable chaping and spacing of the parts, adequate supply of lubricant and suitable choice of lubricant according to the speeds and loads to be provided for.

The lubricant introduced to the shaft, which is either fresh lubricant or recirculated and therefore cooled lubricant apparently reinforces, spreads over and cools the lubricant present on the shaft.

The number of bearing blocks to be employed may be selected according to the nature and directions of the loads to which the bearing is to be subjected. If two bearing blocks are employed there will be points or regions of maximum oil pressure at two places or zones only and such a bearing will not as a rule be employed where loads in more than one direction (e. g. vertical loads, either up, or down or both ways) are to be expected. In cases where the direction of loading may vary as in the case of a bearing for a crank shaft three or more blocks will preferably be employed as in that way there will be a component of at least one of the maximum lubricant thrusts in any direction. It will be appreciated of course that even in the case of two symmetrically disposed bearing blocks there will be lubricant pressure components in more than one direction due to the pressures obtaining over some parts at all events of the arcuate bearing surface.

It will be apparent that in a bearing constructed according to the present invention the shaft will when in rotation be actually supported and centered by the lubricant film between the bearing surface and the shaft provided that the bearing surfaces are suitably distributed round the shaft. It is important that the actual bearing surface along which the lubricant pressure is to build up, or to be maintained should be free from discontinuities or interruptions such as transverse grooves or holes as otherwise there will be a tendency for oil to accumulate in the grooves or holes and to become overheated or to escape through the holes thus preventing the pressure from building up, or being maintained so that metal to metal contact and binding might result.

It is to be understood that the invention is applicable to thrust or footstep bearings as well as to bearings of other kinds and in the case of a footstep bearing either or both of the thrust and centering bearing surfaces may be constructed in accordance with the invention.

In order that the invention may be well understood some preferred embodiments of it will now be described by way of example only, with reference to the accompanying drawings in which:—

Figure 1:
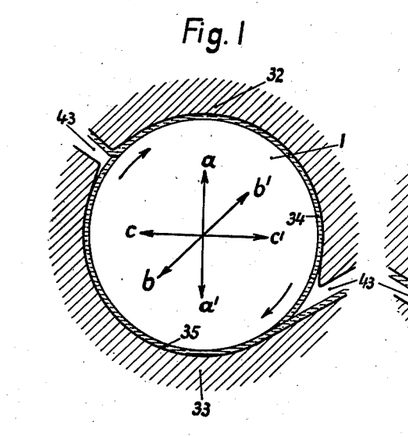
Figure 1 is a diagrammatic sectional view of one form of bearing with two bearing blocks constructed according to the invention.
Figure 2:
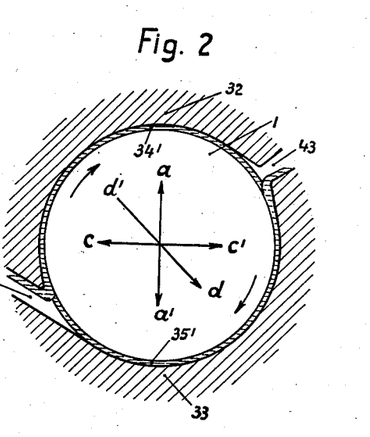
Figure 2 is a similar view of a slight modification for different direction of loading.
Figure 3:
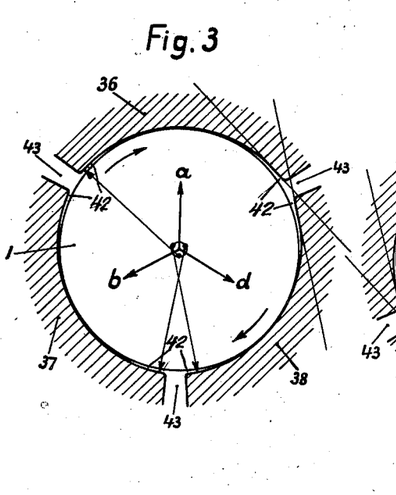
Figures 3 and 4 are similar views of a bearing with three bearing blocks.
Figure 4:
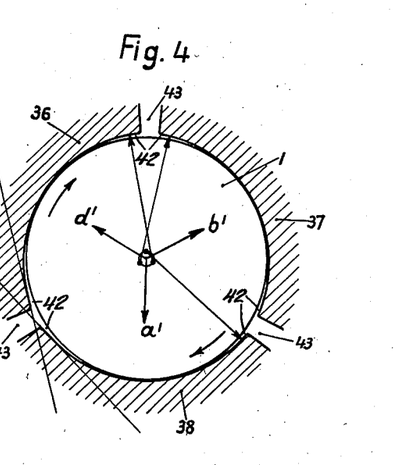

Referring to Figures 1 to 4 of the drawings 1 denotes a shaft or axle to be journalled. The bearing itself is provided in Figures 1 and 2 with two bearing blocks 32, 33 having uninterrupted bearing surfaces 34, 35 and 34', 35' respectively. In Figures 3 and 4 three bearing blocks 36, 37, 38 are provided with uninterrupted bearing surfaces 39, 40, 41 and 39', 40', 41' respectively. In each case, at each end of each bearing surface is a narrow tapering space 42 between the bearing surface and the shaft 1. Thus in the cases illustrated in Figures 1 and 2 the major portion of each bearing surface is a segment of a cylindrical surface of diameter equal to the diameter of the shaft plus twice the thickness of the oil film desired between shaft and bearing assuming the shaft centered between the bearing surfaces. Near the ends of each bearing surface however the latter is continued as a tangential plane surface or at all events as a surface of less curvature to provide the aforesaid spaces 2.

In the forms shown in Figures 3 and 4, each bearing surface coincides with the surface of a cylinder which touches all the surfaces only at one generating line or only over the central portion, and lies outside such a cylinder on either side. Thus for example each bearing surface may be a segment of a cylinder of diameter slightly greater than the diameter of the shaft plus the total clearance, i. e. slightly greater than the diameter of a circle drawn to touch each bearing surface. In this way very long thin arcuate spaces between shaft and bearing may be produced. The radius of curvature of each cylindrical bearing surface may be say 0.2 mm. greater than the radius of the shaft whilst the radius of a circle drawn to touch all the bearing surfaces may be only 0.1 mm. greater than the radius of the shaft. If desired the end portions of the bearing surfaces may be formed by tangent planes as shown and the extreme ends are preferably rounded off slightly.

The lubricant is supplied to the shaft outside the zones of main loading through the spaces or channels 43 between successive bearing blocks. In Figures 1 and 2 in which an even number of blocks is shown the channels 43 are diametrically opposite to one another whereas in the case of an odd number of blocks as illustrated in Figures 3 and 4 each channel 43 is diametrically opposite to the central portion of a bearing surface. This result is obtained in the embodiments illustrated by making the bearing surfaces of equal arcuate length and spacing them uniformly round the shaft.

The bearings illustrated are designed to take loads in the directions a—a', b—b', c—c' according to Figure 1, a—a', c—c', d—d' according to Figure 2, a, b, d according to Figure 3 and a', b', d' according to Figure 4.

The bearings illustrated in Figures 2 and 4 are similar to those of Figures 1 and 2 except that they are displaced through 180° about the axis of the shaft.

This illustrates how bearings may be designed for different directions of loading.

The lubricant is preferably supplied to the channels 43 over the external surfaces of the blocks or of one or more of the blocks, and in Figures 1 and 2 both the channels 43 are directed more or less upwards so as to receive lubricant flowing over the external surface of the block 32.

Since the lubricant is supplied through the channels 43 outside the zones of loading to the narrow tapering arcuate spaces 42 and owing to the fact that the bearing surfaces are uninterrupted a condition of pure fluid friction is established between bearing and shaft at all points even at relatively low speeds. Moreover under the influence of the load the lubricant pressures in the narrow arcuate inlet spaces rise to a value at which they balance the loads whereby as a result of the uniform spacing of the bearing surfaces an automatic balancing and centering of the shaft is produced. This centering and balancing is in no way upset by local displacements of the bearing surfaces owing to local heating since the interspaces 43 allow for peripheral expansion or contraction of the bearing blocks without substantial radial displacement.

Figure 5:
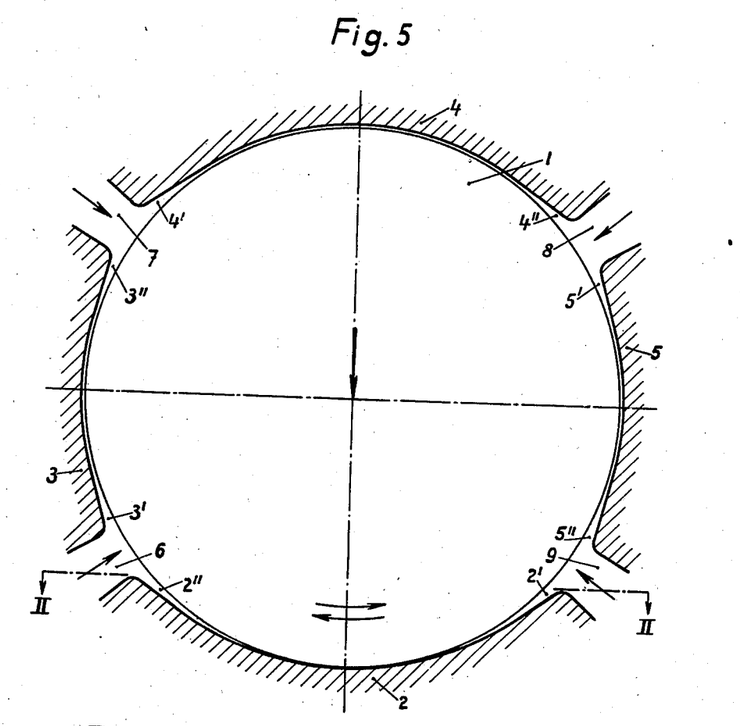
Figure 5 is a diagrammatic sectional view of a form of shaft supporting bearing or journal constructed according to the present invention with four bearing blocks.
Figure 6:
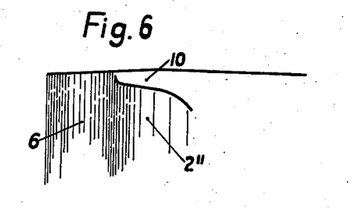
Figure 6 is a plan of a portion of one bearing block taken on the line II—II of Figure 5.

Referring to Figures 5 and 6 of the drawings 1 denotes a shaft the loading on which is vertically downwards. The shaft is journalled in four bearing blocks 2—5. The radius of curvature of each is slightly say from 2–3% greater than half the distance between the opposite blocks of each pair 2, 4 and 3, 5. This distance again is slightly say 0.1 mm. greater than the diameter of the shaft to allow for an intervening oil film. Moreover the bearing blocks whilst being curved over most of their area are continued near their ends tangentially for a short distance and are rounded off as shown at their extreme tips. At each end of each bearing block there is therefore produced a long narrow wedge-like arcuate space tapering towards the central portion between the bearing block and the shaft as indicated at 2', 2'', 3', 3'', 4', 4'' and 5', 5''. Suitable means are provided for supplying oil to the shaft at the spaces 6, 7, 8, 9 between the bearing blocks. Thus for example the bearing may be submerged entirely in oil or the said passages may be provided with oil by means of a drip, splash or forced feed.

If the shaft is rotated in a clockwise direction for example fresh or cooled oil supplied through the channels 6, 7, 8 and 9 is carried by the shaft and the layer of oil thereon into the spaces 3', 4', 5' and 2' where it spreads over the oil film on the shaft and as the shaft rotates with the fresh quantities of oil carried with it the pressure in the spaces 3', 4', 5' and 2' increases reaching a maximum at about the mid points of the bearing blocks where the distances between the shaft and bearing blocks are a minimum. As regards the blocks 3 and 5 these distances determine the thickness of the oil film at the points of minimum distance. At the mid point of the block 2 the shaft is lifted up by the oil pressure and balanced between the pressure at the block 2 and that at the block 4. The thickness of the oil film on the shaft 1 is therefore, in contradistinction to the case with previous bearings not determined exclusively by the conditions prevailing at the zone of loading with an invariable upper limit, but the conditions outside the zone of loading are also material factors. These conditions can be so chosen that there is a marked increase in the thickness of the oil film as compared with those obtainable with previous bearings. This is due largely to the fact that the oil film on the shaft is constantly being cooled by the oil supplied through the channels 6, 7, 8 and 9 so that viscosity of the oil is increased and hence its capacity for entraining fresh quantities of oil with it. At the same time of course the aforesaid pressure increase is brought about in the wedge-like spaces, 3', 4', 5' and 2' and under the influence of this pressure the oil introduced is spread over the oil film already on the shaft which is cooled and rendered viscous and adhesive so that the oil introduced unites with that already on the shaft and reinforces it. Since the radii of curvature and distances apart of the blocks are the same in the embodiment described, the pressure at which the lubricant is spread over the film on the shaft outside the zone of loading is less than the lubricant pressure in the loading zone and is a minimum at the block 4 whilst the pressure is a maximum at the block 2. A medium value of the pressure obtains at the blocks 3 and 5. The pressure at which the oil is spread out therefore increases in stages from a minimum value to a maximum at the zone of loading. Naturally however it is possible by suitable choice of the radii of curvature of the bearing surfaces and clearances to obtain a different pressure distribution round the shaft. Experiments have shown however that an arrangement of pressure distribution on the above principle is the most favourable because any unnecessary increase in the forces exerted on the shaft by the bearing or supporting means, or medium would lead to increased friction.

Figure 6 shows how the wedge-like spaces 2', 3', 4', 5' and 2", 3", 4", 5" can be closed at the end faces of the blocks by suitable raised parts 10 at the inside faces of the blocks so as to avoid loss of pressure on the oil through escape at the ends. Obviously similar effects will be produced in the spaces 2", 3", 4", 5" to those above described if the shaft is rotated in the opposite direction.

Figure 7:
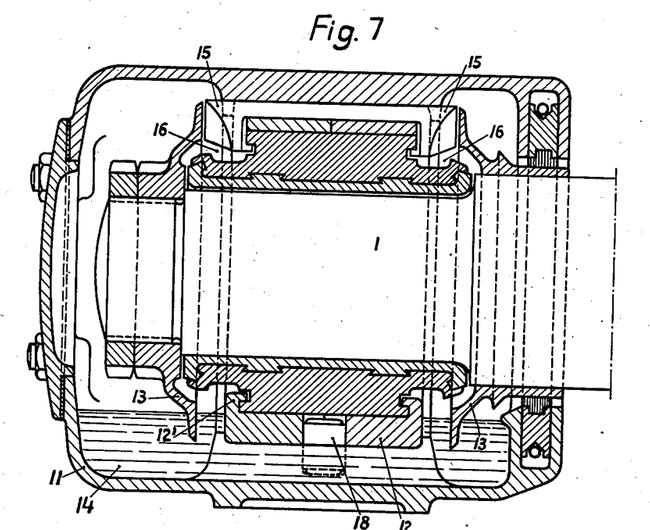
Figure 7 is a longitudinal sectional view of a shaft supporting bearing or journal.
Figure 8:
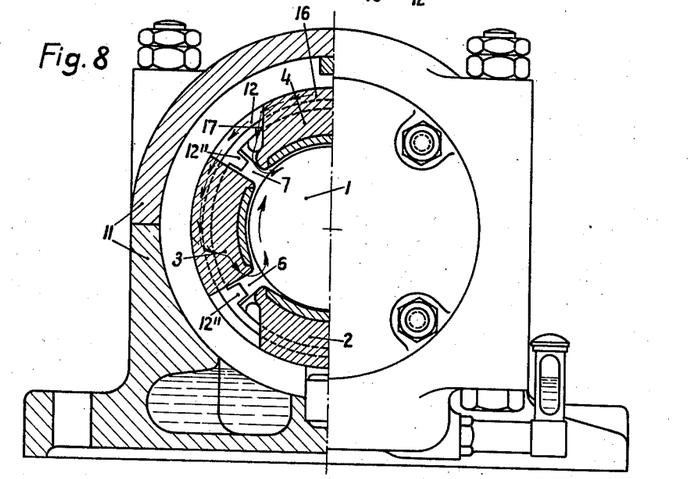
Figure 8 is an end half sectional view of the bearing of Figure 7.

Figures 7 and 8 show in greater detail a bearing constructed in the manner above described and diagrammatically illustrated in Figures 5 and 6 and designed also to take up end thrust. The bearing is provided with a split housing 11 in which is a split holding ring 12 for the bearing blocks 2—5. Projections 12' on the ring 12 prevent the blocks from moving axially whilst projections 12" prevent rotary displacement of the blocks with respect to the ring. The shaft 1 carries oil feeding or splash discs 13 which supply oil from the sump 14 to the scrapers 15. The lubricant supplied in this way to the top of the block 4 flows down grooves 16 provided in the outer surface of the holding ring 12. This ring is interrupted opposite the intermediate spaces 6 and 7 (Figure 8) so that the oil coming from above through the grooves 16 passes onto the inclined surfaces 17 and thence into the intermediate space 7. The oil passes through the medium of directing walls 17 into the intermediate space 6. Displacement of the holding ring 12 is prevented by the members 18. In so far as it is necessary to supply oil to the channels 6 and 9 it may be squirted in. If the shaft is not to make impulsive movement so that no packing difficulties arise the oil may be supplied to the channels 6 and 9 by arranging that they lie below the oil level. Any other suitable means of supply could be employed however.

Figure 9:
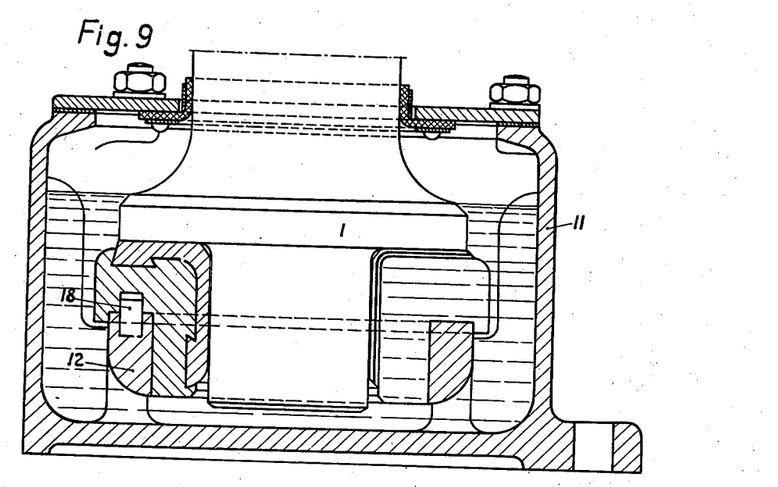
Figure 9 is a vertical central section of a vertical footstep bearing embodying the invention.
Figure 10:
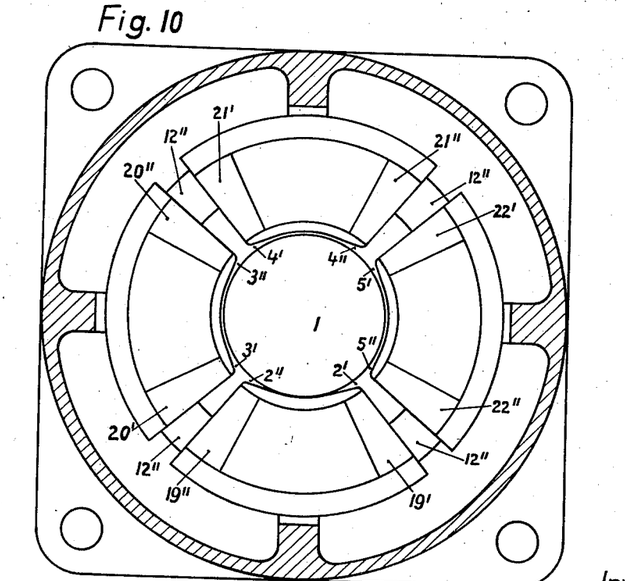
Figure 10 is a horizontal section of the bearing shown in Figure 9.

Referring to Figures 9 and 10 of the drawings in which a footstep bearing is shown, again four bearing blocks 2—5 are provided which are constructed to provide at their inner surfaces as well as at their upper (thrust) surfaces wedge-like arcuate spaces 2', 2" to 5', 5" and 19', 19" to 22', 22". A securing ring 12 with positioning projections 12" receives the blocks and keeps them in proper relative position. If the shaft is subjected to no radial forces, the inner surfaces of the blocks serve solely for guiding the shaft whilst the load is taken by the upper bearing surfaces. In order that oil may be continuously supplied to the channels between the blocks the oil level is maintained above the blocks in the housing 11.

Figure 11:
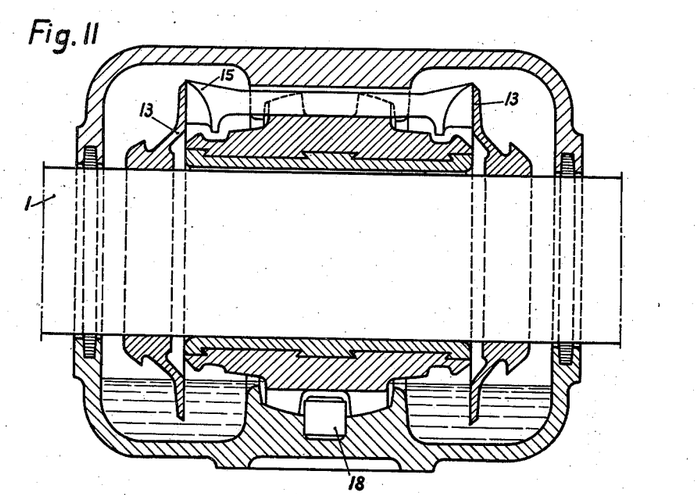
Figures 11 and 12 are views similar to Figures 7 and 8 of a further form of shaft supporting bearing or journal.
Figure 12:
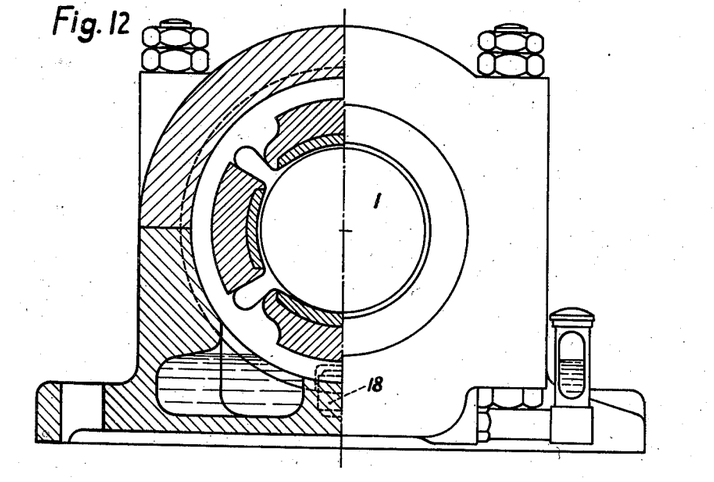

Figures 11 and 12 show a shaft supporting bearing or journal similar to that of Figures 3 and 4 but without provision for taking up end thrust. Splash discs 13 are again arranged on the shaft 1 to supply oil to the scrapers 15 and thence to the spaces between the individual blocks.

Figure 13:
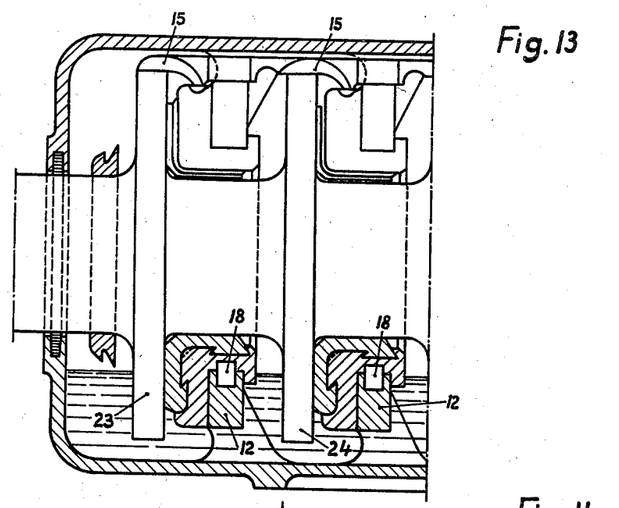
Figures 13 and 14 are other similar views of a horizontal thrust or collar bearing.
Figure 14:
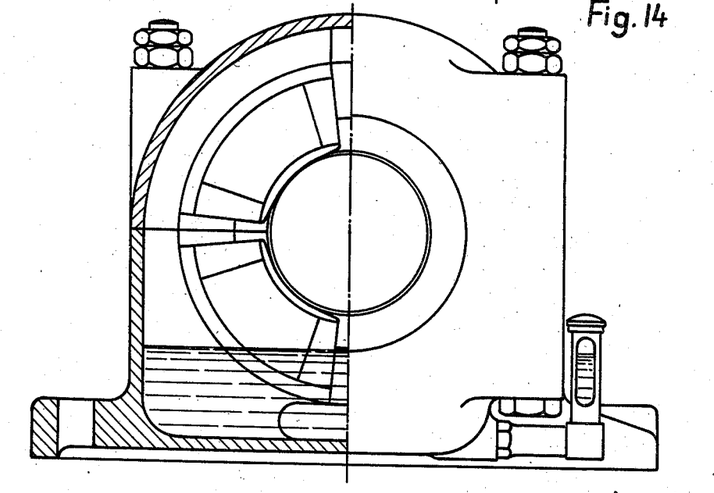

Figures 13 and 14 illustrate the corresponding construction of a double flange thrust or collar bearing. The flanges or collars 23, 24 serve to transmit the thrust and also as splash flanges from which the oil is scraped off by the scrapers 15. Here again holding rings 12 are provided for the two sets of bearing blocks which are constructed similarly to those of Figures 5 and 6.

Figure 15:
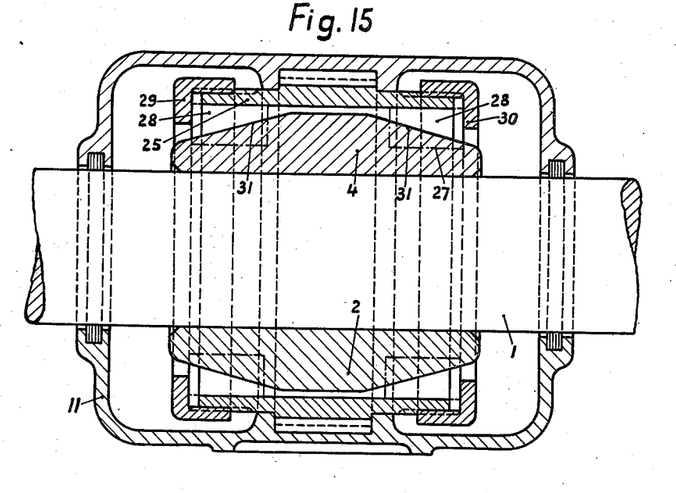
Figures 15 and 16 are respectively a longitudinal and transverse section of an adjustable bearing.
Figure 16:
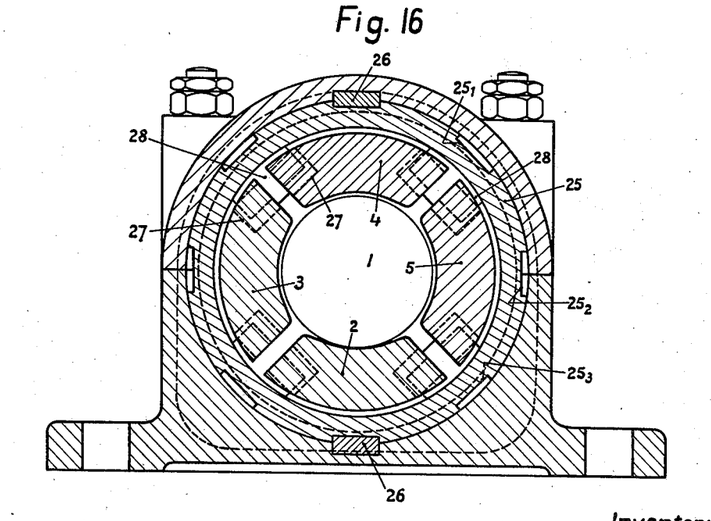

Figures 15 and 16 show a transmission bearing which is constructed in the manner diagrammatically shown in Figure 1 but in which however it cannot be seen before installation in what direction the main load will act and what guiding and bearing play must be provided. The bearing blocks are accordingly arranged so as to be adjustable circumferentially so that the supporting or load carrying bearing block can be adjusted to lie in the main load zone. The blocks 2—5 are arranged in a ring 25 having on its outside, grooves $25_1$, $25_2$, $25_3$, etc. The ring 25 with the bearing blocks can be rotatably adjusted in the housing 11 so that a block is in the zone of loading and the ring can be fixed in its adjusted position by means of keys 26 which fit into two of the grooves 25, etc., and in corresponding grooves in the housing 11. The blocks themselves have at their ends recesses 27. In each of each pair of opposite recesses 27 engages a block member 28 which on the one hand maintains the mutual position of the blocks and on the other hand bears on the conically formed outer surfaces 31 of the blocks. The outer end faces of the members 28 bear against flanged rings 29 and 30 which are screwed on to the ends of the ring 25. If the flanged rings 29 and 30 are screwed upon the ring 25, the members 28 at opposite ends of the ring 25 approach one another thereby causing the blocks 2—5 to approach one another by reason of the inclined surfaces 31. In this way the bearing and guiding play can be adjusted to any desired value. In a similar manner the blocks could be adjusted in thrust or flange bearings.

Whilst in the foregoing I have described some preferred embodiments of this invention it is to be understood that various modifications may be made without departing from the scope thereof. Thus for example if desired the individual guiding and/or bearing blocks could be made radially, axially or circumferentially adjustable.

I claim:

A shaft bearing comprising a bearing member, a plurality of smooth-faced circumferentially spaced bearing surfaces therein, a smooth-faced rotary member rotatably mounted in the said bearing surfaces, each of said bearing surfaces being so shaped as to form with the surface of the rotary member, narrow, tapering inlet spaces for both directions of rotation, the radius of curvature of each bearing surface being at all points greater than the radius of a cylindrical surface which touches all the said bearing surfaces internally, and means for supplying lubricant to the inlet spaces through the interspaces between successive bearing surfaces, separate circumferentially spaced bearing blocks on which said surfaces are located, said blocks being adjustable radially and circumferentially.

FRITZ PESARESE.